(12) United States Patent
Lee et al.

(10) Patent No.: US 12,241,633 B2
(45) Date of Patent: Mar. 4, 2025

(54) RANGE HOOD AND METHOD FOR CONTROLLING THE SAME

(71) Applicant: SAMSUNG ELECTRONICS CO., LTD., Suwon-si (KR)

(72) Inventors: Sangjin Lee, Suwon-si (KR); Sangjin Kim, Suwon-si (KR); Changhoon Oh, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 245 days.

(21) Appl. No.: 18/090,489

(22) Filed: Dec. 29, 2022

(65) Prior Publication Data

US 2023/0280043 A1    Sep. 7, 2023

Related U.S. Application Data

(63) Continuation of application No. PCT/KR2022/020175, filed on Dec. 13, 2022.

(30) Foreign Application Priority Data

Mar. 3, 2022  (KR) .................. 10-2022-0027669

(51) Int. Cl.
*F24C 15/20* (2006.01)

(52) U.S. Cl.
CPC .......... *F24C 15/20* (2013.01); *F24C 15/2021* (2013.01)

(58) Field of Classification Search
None
See application file for complete search history.

(56) References Cited

U.S. PATENT DOCUMENTS

| 6,974,937 B2 | 12/2005 | Kim |
| 7,601,054 B2 * | 10/2009 | Bagwell .................. F24F 11/62 |
| | | 454/67 |
| 7,866,312 B2 * | 1/2011 | Erdmann ............ F24C 15/2042 |
| | | 126/299 F |

(Continued)

FOREIGN PATENT DOCUMENTS

| JP | 7120037 A | 5/1995 |
| JP | 4875383 B2 | 2/2012 |

(Continued)

OTHER PUBLICATIONS

International Search Report with Written Opinion issued in International Application No. PCT/KR2022/020175; International Filing Date Dec. 13, 2022; Date of Mailing Apr. 17, 2023 (11 pages).

*Primary Examiner* — Joseph A Dillon, Jr.
(74) *Attorney, Agent, or Firm* — CANTOR COLBURN LLP

(57) ABSTRACT

Provided is a range hood including a first case including a first inlet formed on a lower surface and a damper formed on an upper surface, a second case arranged over the first case to form a space in which a fan module is arranged, and including a second inlet formed on a side surface, a first sensor arranged in the second case and configured to detect a contaminant, a second sensor arranged above the first sensor and configured to detect a contaminant, and a controller configured to control an output level of the fan module and an opening or closing of the damper based on concentration data of the contaminants obtained from the first sensor and the second sensor.

20 Claims, 18 Drawing Sheets

(56) References Cited

U.S. PATENT DOCUMENTS

| | | | | |
|---|---|---|---|---|
| RE42,735 E | * | 9/2011 | Bagwell | F24F 11/33 |
| | | | | 454/67 |
| 9,221,005 B2 | * | 12/2015 | Roy | B01D 46/446 |
| 9,677,772 B2 | * | 6/2017 | Siegel | F24C 15/2021 |
| 10,195,470 B2 | * | 2/2019 | Livchak | F24C 15/2021 |
| 10,690,353 B2 | | 6/2020 | Park et al. | |
| 11,689,385 B2 | * | 6/2023 | Hwang | H04L 12/2809 |
| | | | | 700/275 |
| 11,946,650 B2 | * | 4/2024 | Cha | H04N 23/57 |
| 12,066,192 B2 | * | 8/2024 | Moore | F24F 11/0001 |
| 2005/0224069 A1 | * | 10/2005 | Patil | F24C 15/2021 |
| | | | | 126/299 D |
| 2006/0278216 A1 | * | 12/2006 | Gagas | F24C 15/2028 |
| | | | | 126/299 D |
| 2009/0048714 A1 | * | 2/2009 | Hanawalt | F24C 15/2021 |
| | | | | 126/299 D |
| 2010/0297928 A1 | | 11/2010 | So | |
| 2011/0308825 A1 | * | 12/2011 | Lee | F24C 15/2021 |
| | | | | 169/65 |
| 2021/0123602 A1 | * | 4/2021 | Heo | F24C 15/2057 |
| 2022/0381446 A1 | * | 12/2022 | Lee | H04R 1/403 |

FOREIGN PATENT DOCUMENTS

| | | |
|---|---|---|
| JP | 2019015451 A | 1/2019 |
| KR | 20020027119 A | 4/2002 |
| KR | 100584309 B1 | 5/2006 |
| KR | 100845577 B1 | 7/2008 |
| KR | 100946802 B1 | 3/2010 |
| KR | 2020110012038 U | 12/2011 |
| KR | 2020120007252 U | 10/2012 |
| KR | 101773566 B1 | 8/2017 |
| KR | 101852796 B1 | 4/2018 |
| KR | 20180081343 A | 7/2018 |
| KR | 101873701 B1 | 8/2018 |
| KR | 102090584 B1 | 3/2020 |
| KR | 20200077457 A | 6/2020 |
| KR | 102159103 B1 | 9/2020 |
| KR | 102263270 B1 | 6/2021 |
| KR | 102276298 B1 | 7/2021 |
| KR | 20210092045 A | 7/2021 |
| KR | 20220040746 A | 3/2022 |
| WO | 2008114906 A1 | 9/2008 |
| WO | WO-2019131360 A1 * | 7/2019 |

* cited by examiner

400

400

RANGE HOOD AND METHOD FOR CONTROLLING THE SAME

CROSS-REFERENCE TO RELATED APPLICATION

This application is a continuation application, claiming priority under § 365(c), of an International Application No. PCT/KR2022/020175, filed on Dec. 13, 2022 which is based on and claims the benefit of a Korean patent application number 10-2022-0027669, filed on Mar. 3, 2022, in the Korean Intellectual Property Office, the disclosure of which is incorporated by reference herein in its entirety.

BACKGROUND

1. Field

The disclosure relates to a range hood and to a method for controlling the same.

2. Discussion of Related Art

A range hood is a device that is arranged above a gas stove or an induction range for sucking or drawing in contaminants such as burning gas, fine dust, ultrafine dust, etc., that are produced when a food is heated.

When operated, the range hood sucks or draws in the contaminants as the contaminants rise from a cooking apparatus through a suction surface that faces down from the range hood and discharges the contaminants to an exterior environment outside a building in which the range hood operates.

The suction surface of the range hood is separated from the ceiling and the cooking apparatus by certain distances, so some of the contaminants may not be drawn in through the suction surface but may rise to the ceiling and diffuse in or throughout the kitchen space.

To make up for these shortcomings, there may be some schemes for increasing suction power of the range hood or installing a cover. Such schemes are often inefficient in terms of energy consumption, noise and appearance.

SUMMARY

The disclosure provides a range hood and to a method for controlling the same to prevent contaminants not sucked by the range hood from diffusing to the ceiling.

The disclosure also provides a range hood and to a method for controlling the same to reduce contaminants diffused indoors by using an external sensor in addition to the range hood.

According to an aspect of the disclosure, a range hood includes a first case including a first inlet formed on a lower surface and a damper formed on an upper surface, a second case arranged over the first case to form a space in which a fan module is arranged and including a second inlet formed on a side surface, a first sensor arranged in the second case and configured to detect a contaminant, a second sensor arranged above the first sensor and configured to detect the contaminant and a controller configured to control an output level of the fan module and to open or close the damper based on concentration data of the contaminants obtained from the first sensor and the second sensor.

According to an aspect of the disclosure, a method of controlling a range hood includes receiving data of first and second concentrations of the contaminant from the first and second sensors, determining magnitudes of the first and second concentrations and which of the first and second concentrations exceeds the other and controlling an output level of the fan module and an opening or closing of the damper based on determined magnitudes of the first and second concentrations and a determination of which of the first and second concentrations exceeds the other.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
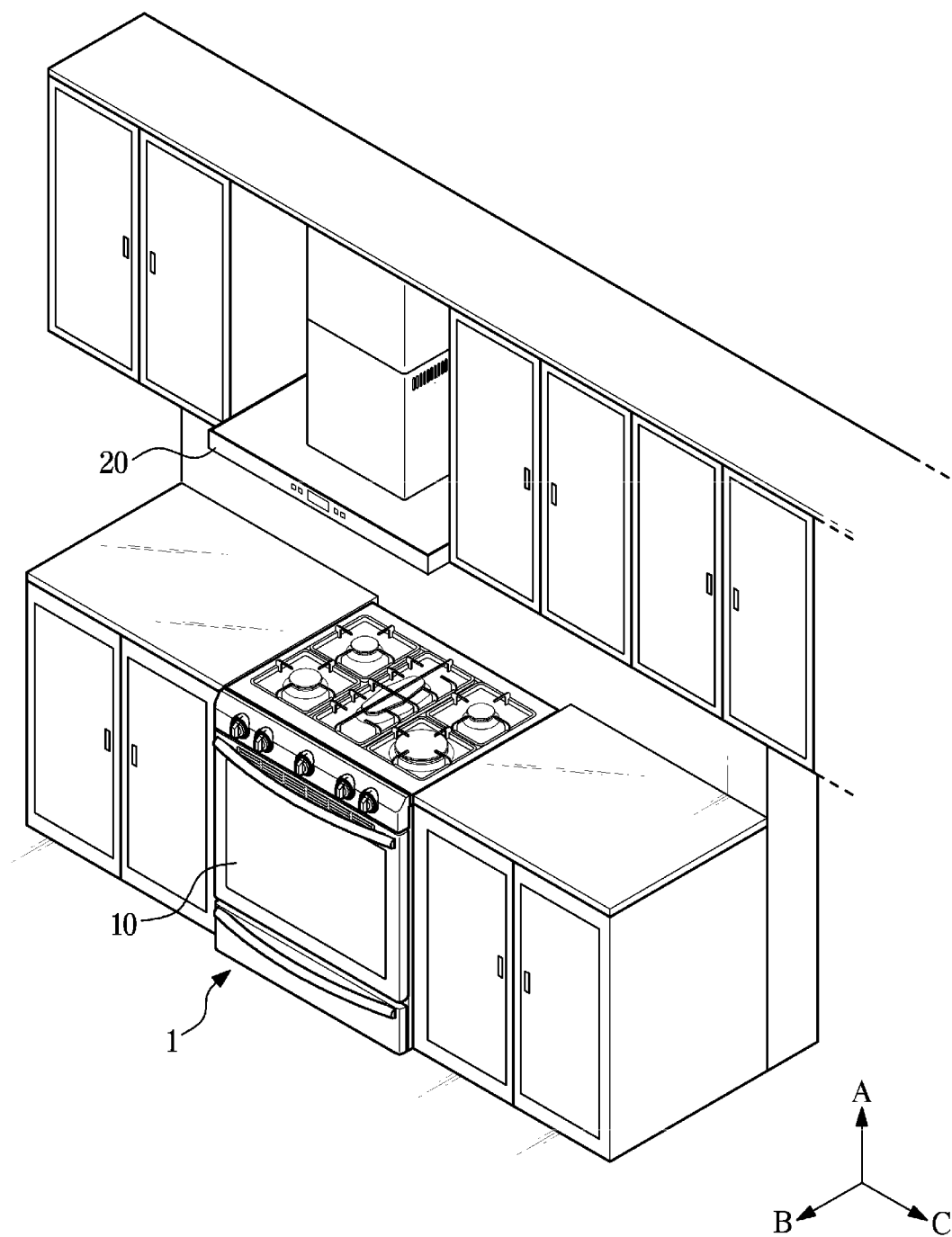
FIG. 1 is a perspective view of a cooking apparatus installed in a space according to an embodiment of the disclosure.

Like numerals refer to like elements throughout the specification. Not all elements of embodiments of the disclosure will be described, and description of what are commonly known in the art or what overlap each other in the embodiments will be omitted. The term 'unit, module, member, or block' may refer to what is implemented in software or hardware, and a plurality of units, modules, members, or blocks may be integrated in one component or the unit, module, member, or block may include a plurality of components, depending on the embodiment of the disclosure.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

Throughout the specification, when it is said that a member is located "on" another member, it implies not only that the member is located adjacent to the other member but also that a third member exists between the two members.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

Reference will now be made in detail to embodiments of the disclosure, which are illustrated in the accompanying drawings.

Figure 2:
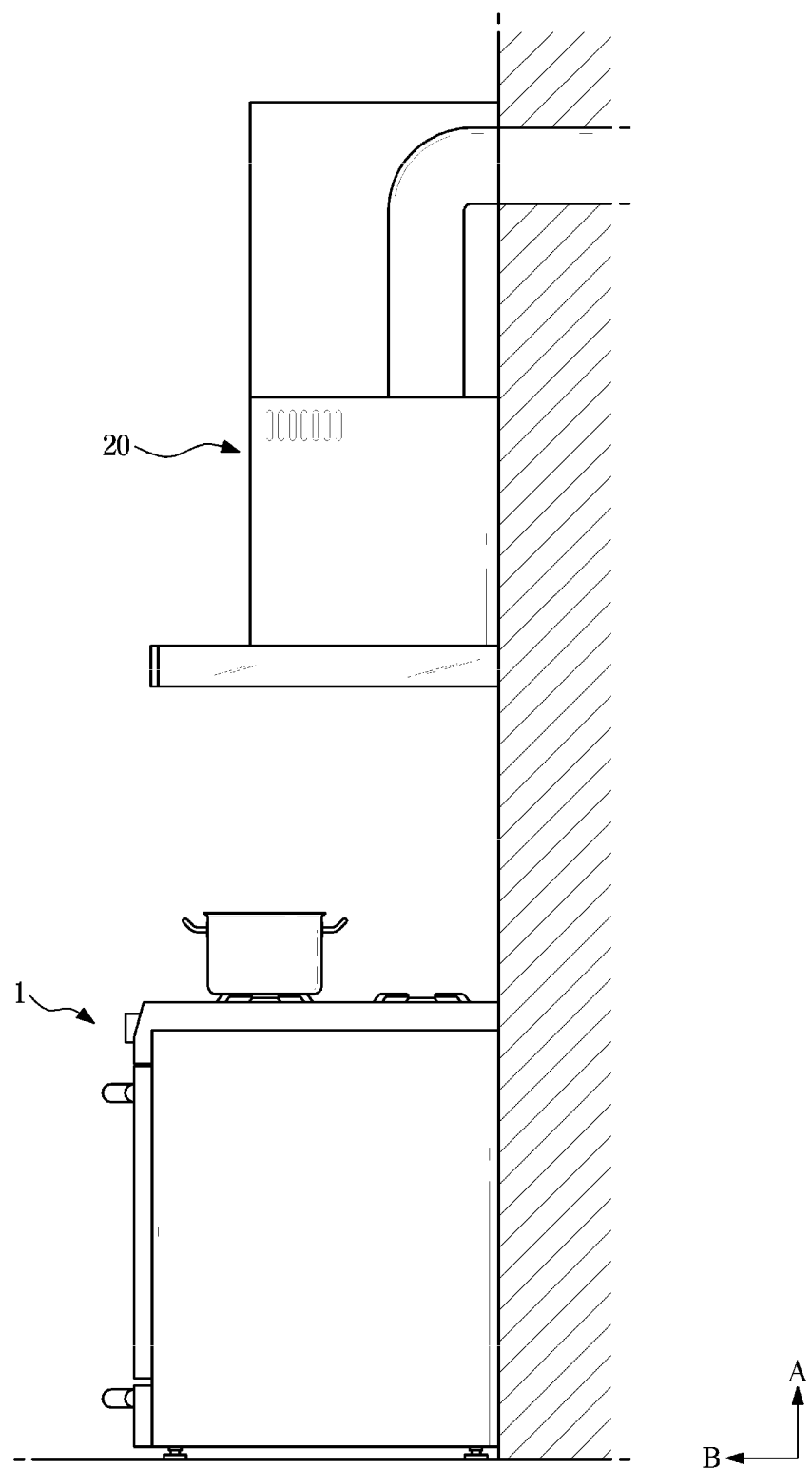
FIG. 2 is a side cross-sectional view of a cooking apparatus installed in a space according to an embodiment of the disclosure.

FIG. 1 is a perspective view illustrating a cooking apparatus installed according to an embodiment of the disclosure. FIG. 2 is a side cross-sectional view of a cooking apparatus installed according to an embodiment of the disclosure.

Referring to FIGS. 1 and 2, a cooking apparatus 1 may be placed in a space indoors. For example, the cooking apparatus 1 may be installed in a kitchen inside a building. The cooking apparatus 1 may be combined with cabinetry.

The cooking apparatus 1 may include a heating device 10 to heat foods. The heating device 10 may include an oven, a gas stove, an induction range, etc. The heating device 10 may include a cooktop unit on which to place and cook the foods.

The cooking apparatus 1 may include a range hood 20. The range hood 20 may suck or draw in fine dust, ultrafine dust, exhaust fumes, smoke or food smell, etc., which is produced from the heating device 10, and may discharge the fine dust, ultrafine dust, exhaust fumes, smoke or food smell, etc., to an exterior environment such as an outdoor space.

Although the range hood 20 is defined as a constituent of the cooking apparatus 1 in an embodiment of the disclosure, it is not limited thereto and the range hood 20 may be defined as a device independent of the cooking apparatus 1.

The range hood 20 is not limited to the aforementioned embodiments, but may be provided in combination with a cooking device unit such as an Over The Range (OTR) unit.

The range hood 20 may be placed at or among upper cabinetry. The heating device 10 of the cooking apparatus 1 may be installed below the range hood 20 at a certain distance from the range hood 20 in a first direction A. The heating device 10 may be placed at or among lower cabinetry. Hereinafter, the first direction A will refer to a vertical direction.

In other words, the range hood 20 may be arranged above the heating device in the first direction A. Accordingly, the range hood 20 may suck or draw in exhaust fumes, smoke or food smell, etc., which are produced from the heating device 10, and may discharge the exhaust fumes, smoke or food smell, etc., to the exterior environment such as the outdoor space.

Although the cooking apparatus 1 is described as being installed indoors, where and how to install the cooking apparatus 1 is not limited thereto and the cooking apparatus 1 may be installed in various methods depending on the size or nature of a place in which the cooking apparatus 1 is installed, purpose of installation, etc.

The range hood 20 will now be described in detail.

Figure 3:
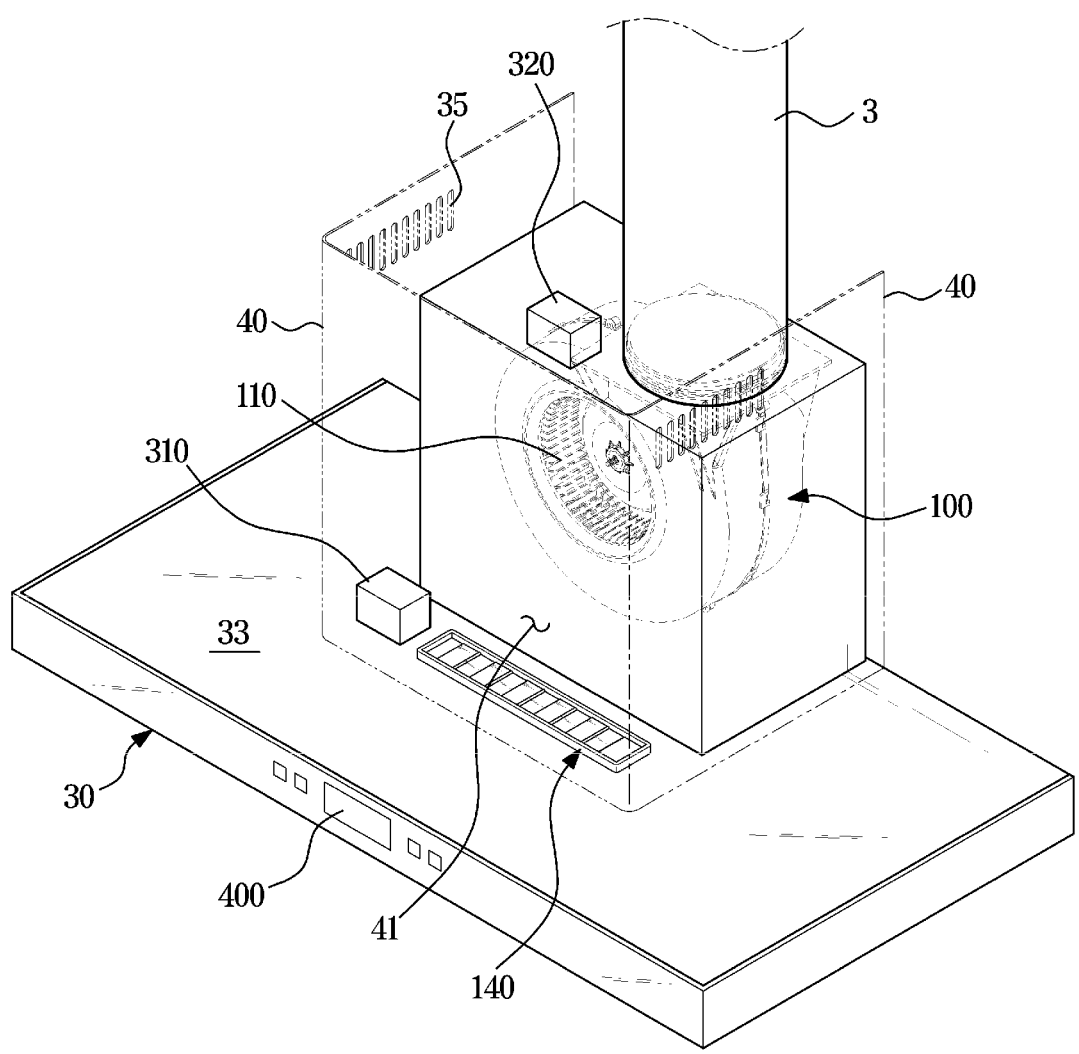
FIG. 3 is a perspective view of a range hood according to an embodiment of the disclosure.
Figure 4:
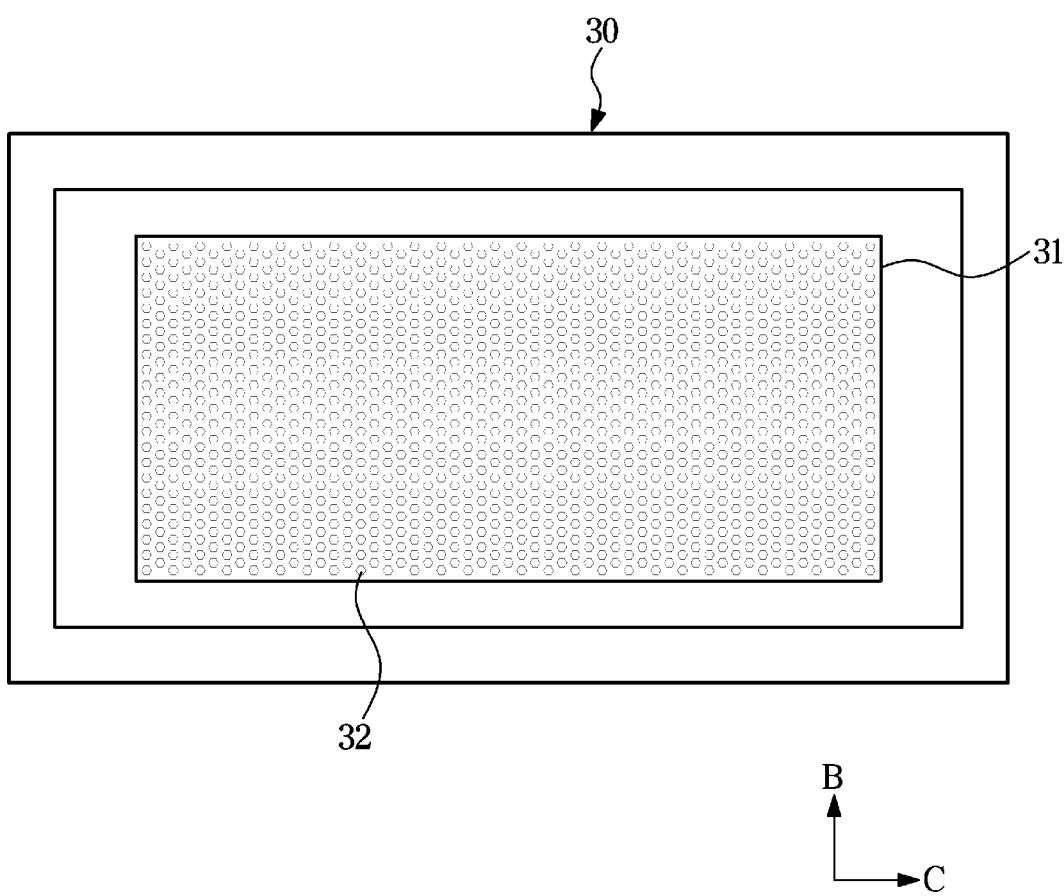
FIG. 4 is a bottom view of a range hood according to an embodiment of the disclosure.

FIG. 3 is a perspective view of a range hood according to an embodiment of the disclosure. FIG. 4 is a bottom view of a range hood according to an embodiment of the disclosure.

Referring to FIGS. 3 and 4, the range hood 20 may include a first case 30, a second case 40, and a fan module 100.

The first case 30 may include a first inlet 31 through which smoke or other contaminants produced from the heating device 10 flow in. The first inlet 31 may be formed on a lower surface of the first case 30. A filter 32 matching certain dimensions of the first inlet 31 may be installed at or near the first inlet 31. The filter 32 may be installed at the first case 30 to cover the first inlet 31. The filter 32 may be provided to filter out foreign materials contained in the smoke brought in through the first inlet 31.

The first case 30 may be shaped almost like a rectangular parallelepiped. A flow path 33 may be formed in the first case 30. The flow path 33 may be formed to lead air that has passed the filter 32 and the first inlet 31 to the second case 40. The flow path 33 may refer to an internal space of the first case 30, and alternatively, to a space separately partitioned in the first case 30 or a duct installed in the first case 30.

A damper 140 may be provided on the upper surface of the first case 30 to lead outside air brought in through a second inlet 35, which will be described later, to an exhaust pipe 3 or to block the outside air. The damper 140 may be opened or closed according to a control signal, and may have a rotational structure that enables the control of opening degree. When a fan 110 of a fan module 100 is rotated and the damper 140 is opened, the outside air flows in through the second inlet 35 and moves to the exhaust pipe 3.

The damper 140 may be provided on the upper surface of the first case 30 and may be arranged in a portion of an overlapping area between the first case 30 and the second case 40.

The second case 40 may be arranged on top of the first case 30. The fan module 100 may be arranged in the second case 40. Similar to the first case 30, the second case 40 may be shaped almost like a rectangular parallelepiped. The second case 40 may have smaller areas of lower and upper surfaces and may be taller than the first case 30. The second case 40 may be separately provided and combined with the first case 30. Alternatively, the second case 40 and the first case 30 may be integrally formed. In this case, the upper surface of the first case 30 extends upward at an angle inclined to the first direction A, so that the second case 40 may be integrally formed with the first case 30.

The second case 40 may include the second inlet 35 through which the smoke that is produced from the heating device 10 and which becomes stagnant on the ceiling side without flowing in through the first inlet 30 flows into the second case 40. The second inlet 35 may be formed on both sides or on one side of the second case 40.

A flow path 41 may be formed in the second case 40. The flow path 41 may be connected to the flow path 33 of the first case 30. The air flowing in through the first inlet 31 may pass along the flow path 33 of the first case 30 and then along the flow path 41 of the second case 40 and then may be discharged to the outside through the exhaust pipe 3. The fan module 100 may be provided in or along the flow path 41. The flow path 41 may refer to an internal space of the second case 40. Alternatively, the flow path 41 may refer to a space that is separately partitioned in the second case or to a duct installed in the second case 40.

In an embodiment of the disclosure, the fan module 100 may be placed in the second case 40. Furthermore, the fan module 100 may be arranged so that a rotation axis of the fan 110, which will be described later with reference to FIG. 5, extends in a second direction B. Hereinafter, the second direction will refer to the front-back direction. In other words, the fan module 100 may be arranged so that the rotation axis of the fan 110 extends in the front-back direction. With this arrangement of the fan module 100, the air may be sucked or drawn in from the front of the fan module 100 and discharged upward. The fan module 100 may be connected to the exhaust pipe 3 to discharge the air to the exterior environment such as the outside space.

In the embodiment of the disclosure, a first sensor 310 and a second sensor 320 may be provided in the second case 40. The first sensor 310 may be a particulate matter (PM) sensor, which is a device for measuring a concentration of dust, i.e., a device for measuring a contamination level of indoor fine dust or air. The first sensor 310 may be one of a PM 10 sensor for measuring the concentration of fine dust having a particle size of 10 μm, a PM 2.5 sensor for measuring the concentration of fine dust having a particle size of 2.5 μm, and a PM 1.0 sensor for measuring the concentration of fine dust having a particle size of 1.0 μm. The second sensor 320 may be of a same type as the first sensor 310, and may be arranged at a higher elevation than the location of the first sensor 310 in the second case 40. Accordingly, the first sensor 310 may detect the concentration of contaminants rising from the heating device 10, and the second sensor 320 may detect the concentration of contaminants that are stagnant in a place near the ceiling.

Figure 5:
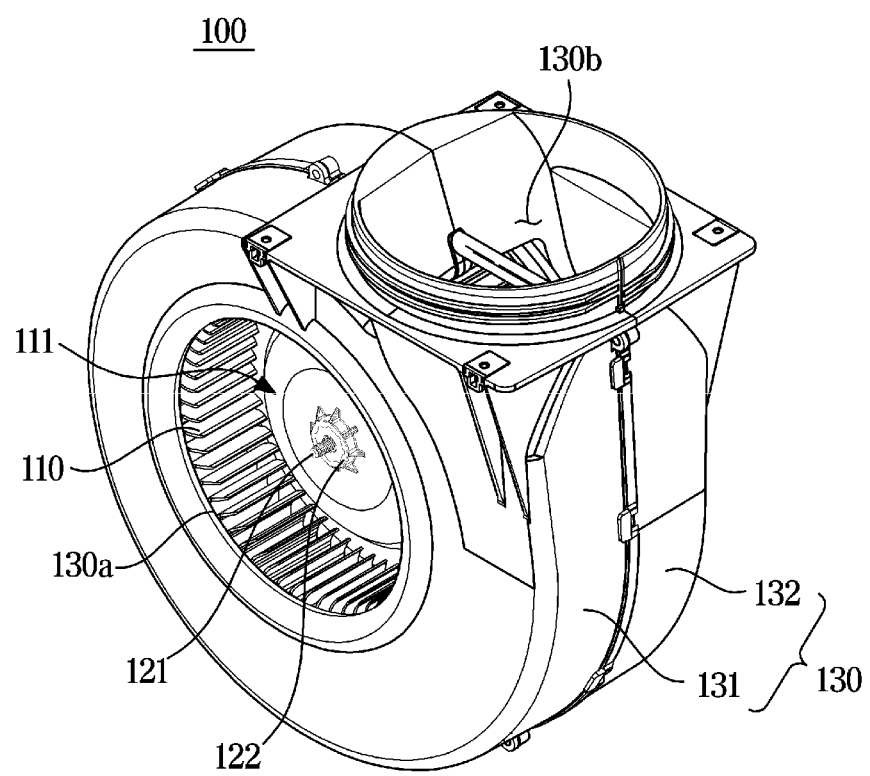
FIG. 5 illustrates a fan module separately from a range hood according to an embodiment of the disclosure.

FIG. 5 illustrates a fan module separately from a range hood according to an embodiment of the disclosure.

The fan module 100 may include the fan 110 that rotates to circulate air, a motor 120 (see FIG. 10) that is provided to rotate the fan 110, and a fan frame 130 that is configured to receive the fan 110 and the motor 120 therein.

The fan 110 may be provided to rotate to thereby circulate air. In an embodiment of the disclosure, the fan 110 may include a centrifugal fan. The centrifugal fan may suck or draw in air in a direction parallel to the rotation axis and may discharge the air in a radial direction. In an embodiment of the disclosure, the fan 110 may be arranged in the second case 40 so that the rotation axis extends in the front-back direction. The fan 110 may include a gear hole 111 formed in the center.

The motor 120 may provide a driving force to rotate the fan 110. The motor 120 may include a rotation shaft 121 and an anti-relative-rotation gear 122 coupled to the rotation shaft 121 to be rotated together with the rotation shaft 121.

The anti-relative-rotation gear 122 may be inserted into the gear hole 111 formed in the center of the fan 110. The gear hole 111 and the anti-relative-rotation gear 122 may be provided to have matching shapes. As the anti-relative-rotation gear 122 and the gear hole 111 are provided to have the matching shapes, the anti-relative-rotation gear 122 inserted to the gear hole 111 may not be rotated relatively in the gear hole 111. The anti-relative-rotation gear 122 may be rotated along with the rotation shaft 121, and may be rotated along with the fan 110 by being inserted to the gear hole 111. Accordingly, when the rotation shaft 121 is rotated by the motor 120, the fan 110 may be rotated.

The fan frame 130 may be provided and configured to receive the fan 110 and the motor 120 therein. The fan frame 130 may include a first fan frame 131 that covers one side of the fan 110 and a second fan frame 132 that covers the other side of the fan 110. The first fan frame 131 and the second fan frame 132 may be coupled to each other by being moved and fastened in the direction of the rotation axis of the fan 110. The first fan frame 131 and the second fan frame 132 may be coupled to each other to form an internal space, and the fan 110 and the motor 120 may be installed in the internal space formed by the first fan frame 131 and the second fan frame 132. Furthermore, the internal space may serve as a flow path in which the air flowing by the fan 110 is moved. In other words, the fan frame 130 may form a flow path in which the air is moved.

The fan frame 130 may include a fan inlet 130a through which air flows in, and the fan outlet 130b through which air is discharged. The air circulated by rotation of the fan 110 may flow into the fan frame 130 through the fan inlet 130a, and pass the inside of the fan frame 130 and flow out of the fan frame 130 through the fan outlet 130b.

The fan inlet 130a may be formed in the first fan frame 131. The fan outlet 130b may be formed when the first fan frame 131 and the second fan frame 132 are coupled together. Specifically, a portion of the fan outlet 130b may be formed by the first fan frame 131 and the other portions of the fan outlet 130b may be formed by the second fan frame 132.

In an embodiment of the disclosure, the fan 110 may be provided as a centrifugal fan with the fan inlet 130a formed to face the front of the range hood 20 and the fan outlet 130b formed to face upward from the range hood 20. The rotation axis of the fan 110 may be parallel to the front-back direction of the range hood 20.

In an embodiment of the disclosure, the air moving by rotation of the fan 110 may flow in through the fan inlet 130a, pass the inside of the fan frame 130, and flow out of the fan outlet 130b. The fan outlet 130b may be connected to the exhaust pipe 3, and the air that flows out of the fan module 100 through the fan outlet 130b may be moved along the exhaust pipe 3 and discharged to the exterior environment such as the outside space.

In the disclosure, unlike the traditional range hood, the second inlet 35 and the damper 140 may be additionally provided to suck or draw in not the air rising from the heating device 10 and the air that is stagnant around the ceiling so that all of the air can be discharged outside. The damper 140 may change the flows of air by being opened or closed according to a control signal from a controller 200 (see FIG. 10). This will be described in detail with reference to FIGS. 6 to 9.

Figure 6:
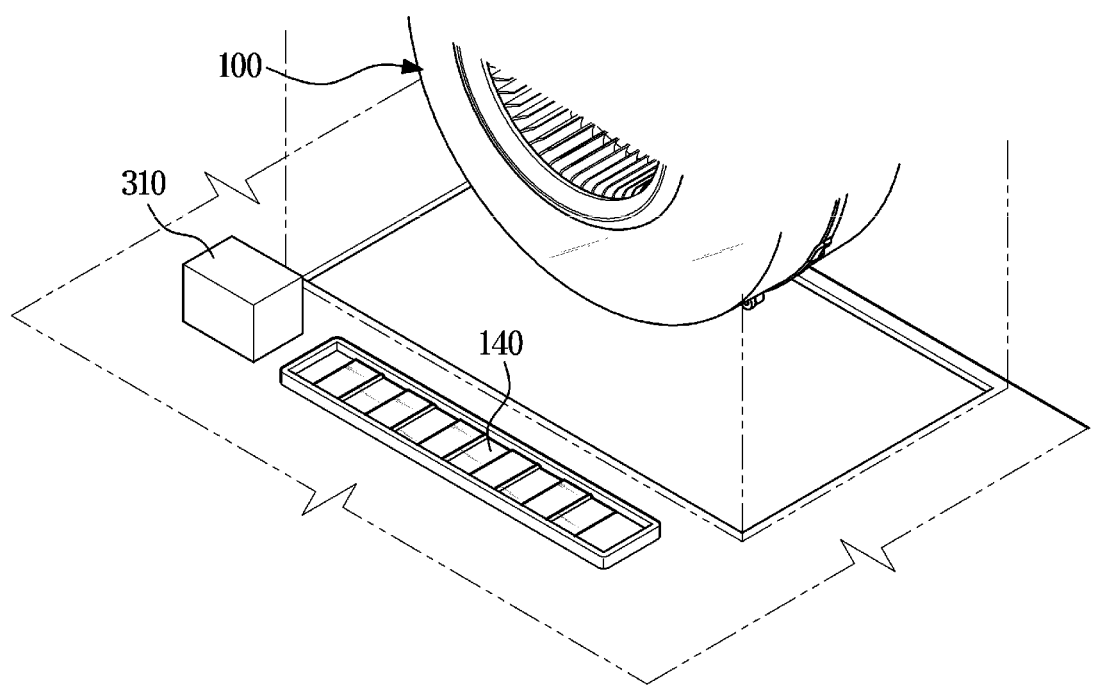
FIG. 6 illustrates a closed state of a damper according to an embodiment of the disclosure.
Figure 7:
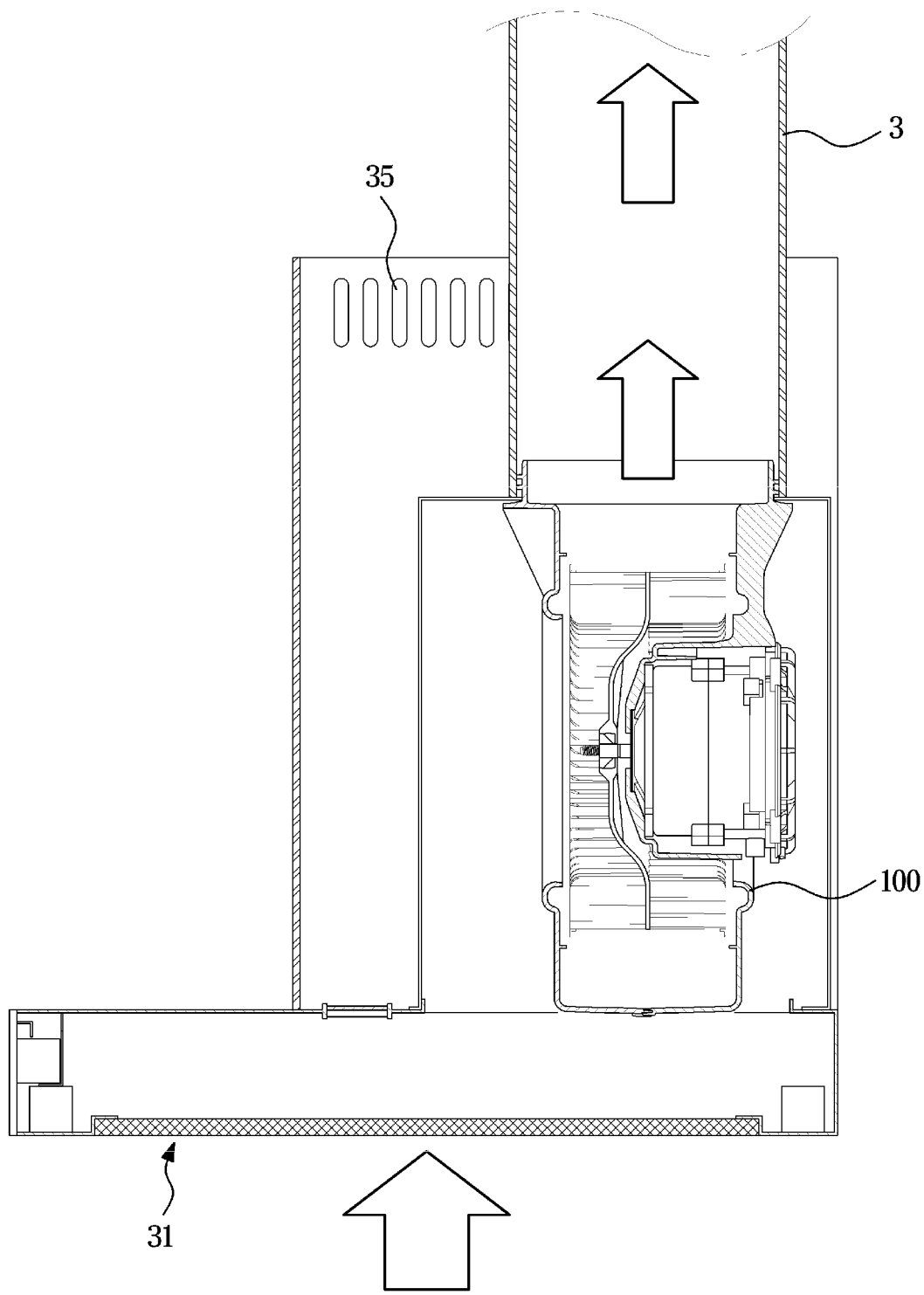
FIG. 7 illustrates flows of air with the damper of FIG. 6 in the closed state according to an embodiment of the disclosure.

FIG. 6 illustrates a closed state of a damper and FIG. 7 illustrates flows of air in the closed state of the damper in a range hood according to an embodiment of the disclosure.

Referring to FIG. 6, illustrated is the damper 140 in a closed state right before or after the cooking apparatus 1 is operated. As the damper 140 is closed, air movement is not made between the first case 30 and the second case 40, but there can be a flow of air through the first inlet 30.

Referring to FIG. 7, while the damper 140 is closed, contaminants produced from the heating device 10 may be brought to the inside of the fan frame 130 (see FIG. 5) through the first inlet 30 (see FIG. 4) and the fan inlet 130a (see FIG. 5) by rotation of the fan 110 (see FIG. 5), may pass through the inside of the fan frame 130, and may be discharged to the outside through the fan outlet 130b (see FIG. 5) and the exhaust pipe 3 (see FIG. 3).

Figure 8:
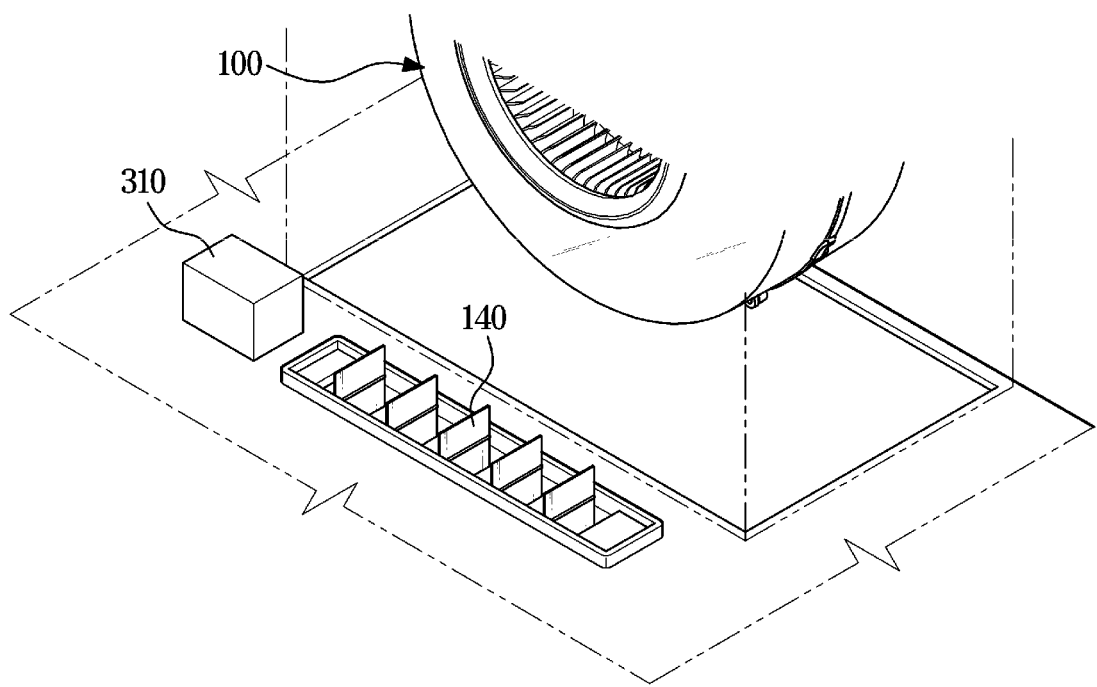
FIG. 8 illustrates an open state of a damper according to an embodiment of the disclosure.

FIG. 8 illustrates an open state of a damper and FIG. 7 illustrates flows of air in the open state of the damper in a range hood according to an embodiment of the disclosure.

Referring to FIG. 8, illustrated is the damper 140 in an open state right after the cooking apparatus 1 has been operated for a certain period of time or right after the operation of the cooking apparatus 1 is terminated. For example, when contaminants are not discharged through the first inlet 30 as the user shifts an object for cooking or contaminants are not sufficiently sucked or drawn in through the first inlet 30 because of a lack of air volume of the fan 110, the damper 140 may be opened to provide suction power for the second inlet 35.

As shown in FIG. 8, the damper 140 has a rotational structure to enable switching between the opening operation and the closing operation, but unlike what is shown, may have a structure that is always open, sucking or drawing in contaminants through the second inlet 35 whenever the fan 110 is rotated. In this case, however, the suction power of the first inlet 30 may be dispersed.

Figure 9:
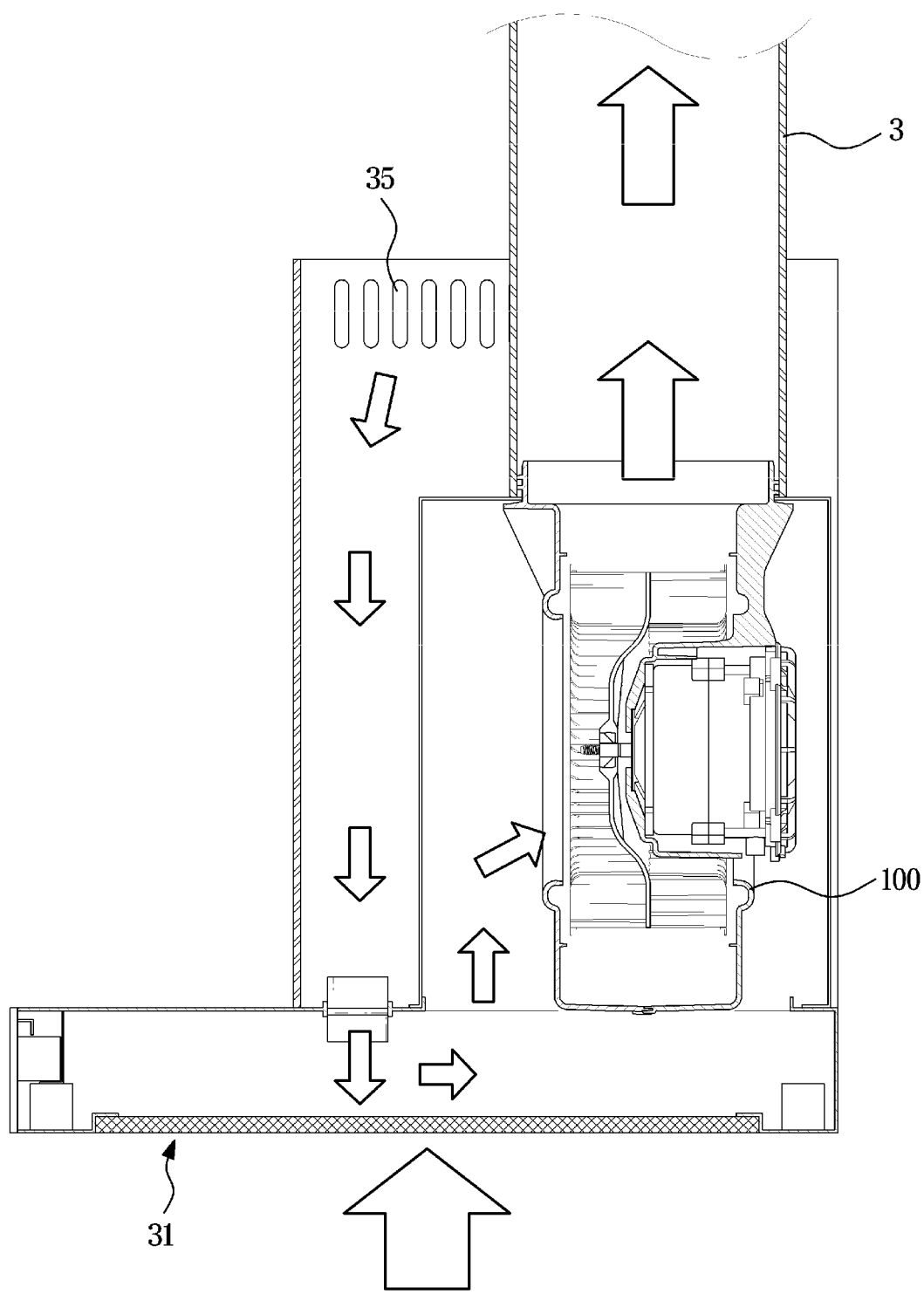
FIG. 9 illustrates flows of air with the damper of FIG. 8 in the open state according to an embodiment of the disclosure.

Referring to FIG. 9, while the damper 140 is opened, air may be brought in through both the first inlet 30 and the second inlet 35. When the damper 140 is opened, the suction power generated by the fan 110 may be conveyed not only to the first inlet but also to the second inlet 35, so that the contaminants stagnant around the ceiling may be sucked or drawn in through the second inlet 35. Accordingly, the contaminants produced from the heating device 10 and the contaminants not sucked or drawn in through the first inlet 30 but stagnant around the ceiling may be brought to the inside of the fan frame 130 through the fan inlet 130a by rotation of the fan 110, may pass the inside of the fan frame 130 and may be discharged to the outside through the fan outlet 130b and the exhaust pipe 3.

Figure 10:
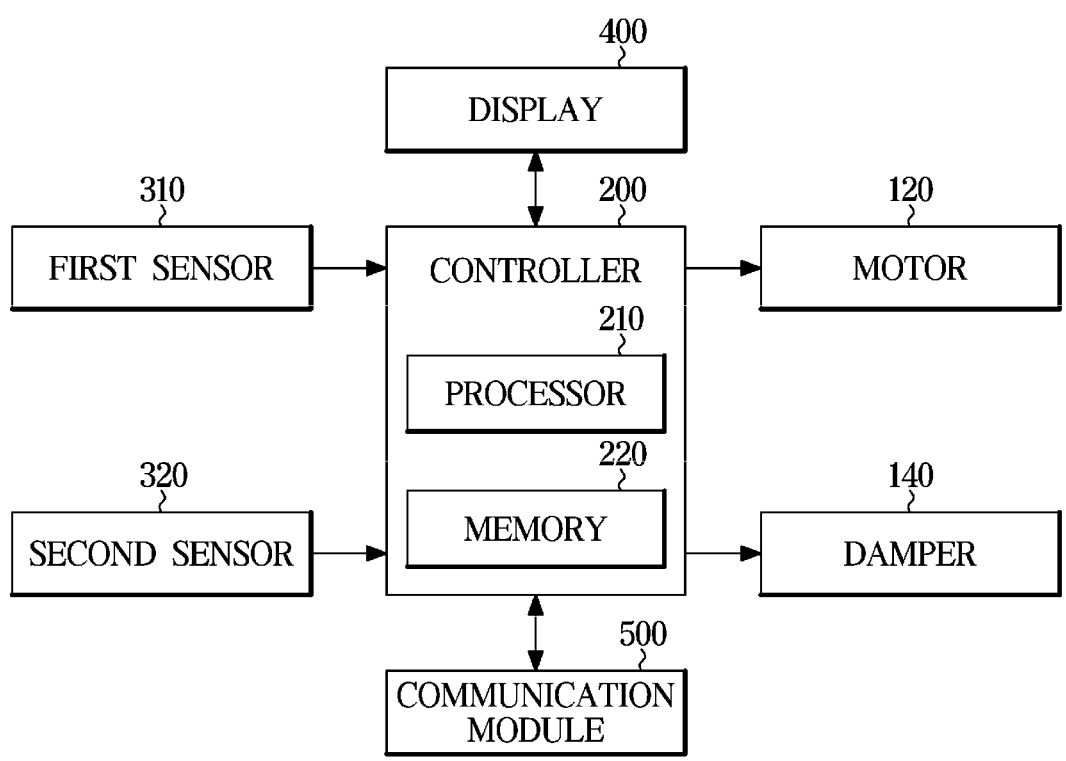
FIG. 10 is a control block diagram of a range hood according to an embodiment of the disclosure.

FIG. 10 is a control block diagram of a range hood according to an embodiment of the disclosure.

In the embodiment of the disclosure, the range hood 10 may include the motor 120 for providing driving force to rotate the fan 110 (see FIG. 5), the damper 140 for controlling conveying of suction power to the second inlet 35 (see FIG. 3), the first and second sensors 310 and 320 for detecting concentration of contaminants, a display 400 for displaying operation status of the range hood 10 and receiving the user input, and a communication module 500 for performing wireless communication with an external device.

The first sensor 310 and the second sensor 320 may be PM sensors, which are a device for measuring the concentration of dust, i.e., a device for measuring indoor fine dust or air concentration. The first sensor 310 and the second sensor 320 may be provided to have a same type and may be arranged at different locations or elevations relative to the range hood.

The first sensor 310 may be installed on a lower side in the second case 40 to directly detect the contaminants produced from the heating device 10.

The second sensor 320 may be installed on an upper side in the second case to detect contaminants produced from the heating device 10 but not sucked or drawn in through the first inlet 31 but stagnant around the ceiling or the existing contaminants floating around the ceiling. As will be described later, the range hood 20 may be equipped with the first sensor 310 by default, and may leave the second sensor 320 out in some embodiments of the disclosure. In this case, the second sensor 320 may be a PM sensor included not in the range hood 20 but in an external device.

The display 400 may include a touch panel (not shown) for receiving a touch input from the user, a display panel (not shown) for displaying operation status of the range hood 20, and a touch screen controller (not shown) for controlling operations of the touch panel and the display panel. The display 400 may display the operation status of the range hood 20 and output the touch input of the user to the controller 200.

The communication module 500 may perform wireless communication with an external device 600 (see FIG. 15), which will be described later. The communication module 500 may be implemented by various radio communication technologies. For example, the communication module 500 may employ at least one of radio frequency (RF), infrared communication, wireless fidelity (Wi-Fi), Bluetooth, Zigbee or near field communication (NFC). For example, the communication module 500 may be a Bluetooth module.

The communication module 500 may transmit or receive data to or from the external device 600. For example, the communication module 500 may receive the concentration of contaminants obtained from the second sensor 320 included in the external device 600 while paired with the external device 600. Furthermore, the communication module 500 may communicate with the external device 600 connected to a network through Wi-Fi to receive the concentration of contaminants obtained from the second sensor 320 included in the external device 600.

The controller 200 may include a memory 220 for storing a program and data for controlling operations of the range hood 20, and a processor 210 for generating control signals to control the operations of the range hood 20 according to the program and data stored in the memory 220. The processor 210 and the memory 220 may be implemented in separate chips or in a single chip.

The memory 220 may store a control program and control data for controlling operations of the range hood 20 and store various application programs and application data for performing various functions in response to inputs from the user. The memory 220 may temporarily store an output level of the fan module 100 for each concentration of contaminants measured by the first sensor and/or the second sensor 320.

The memory 220 may include a volatile memory for temporarily storing data, such as a static random access memory (SRAM), a dynamic random access memory (DRAM), or the like. The memory 220 may also include a non-volatile memory for storing data for a long time, such as a read-only memory (ROM), an erasable programmable ROM (EPROM), an electrically erasable programmable ROM (EEPROM), etc.

The processor 210 may include many different logic circuits and operation circuits, process data according to the program provided in the memory 220, and my generate control signals according to the processing results.

Components of the range hood 20 and operations of the components have thus far been described. Based on the components, a method of controlling the range hood will now be described in detail.

Figure 11:
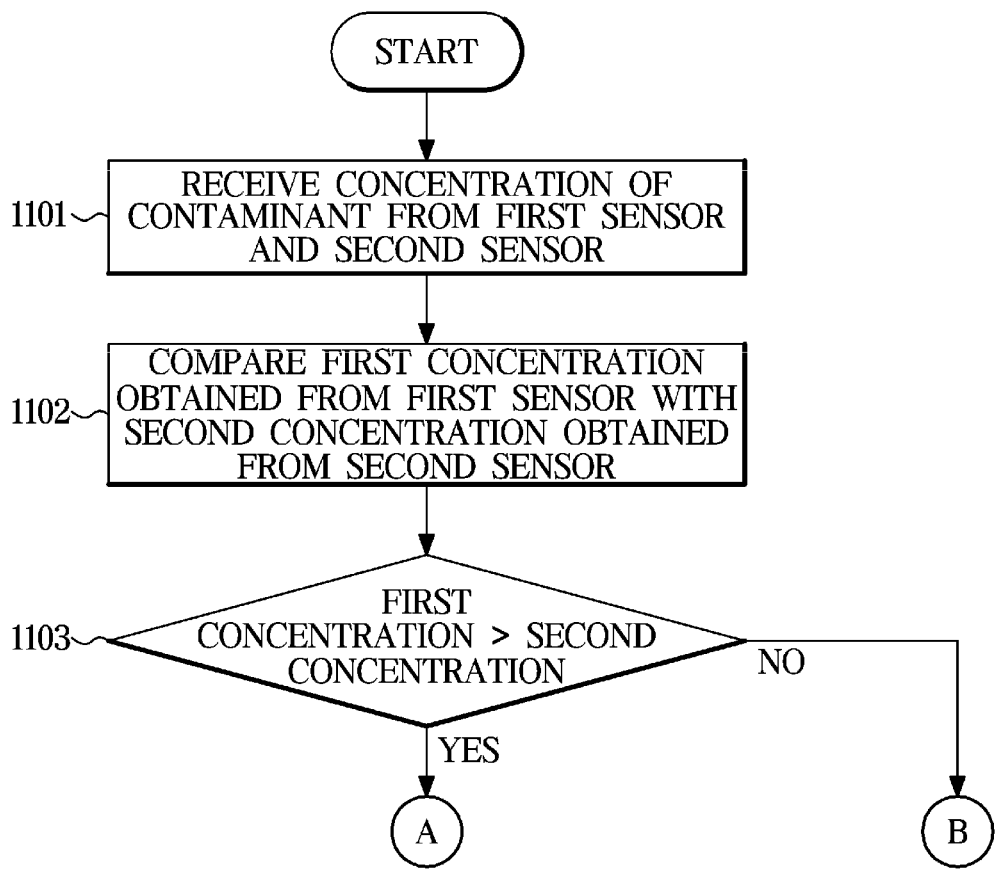
FIG. 11 is a flowchart of a method of controlling a range hood according to an embodiment of the disclosure.
Figure 12:
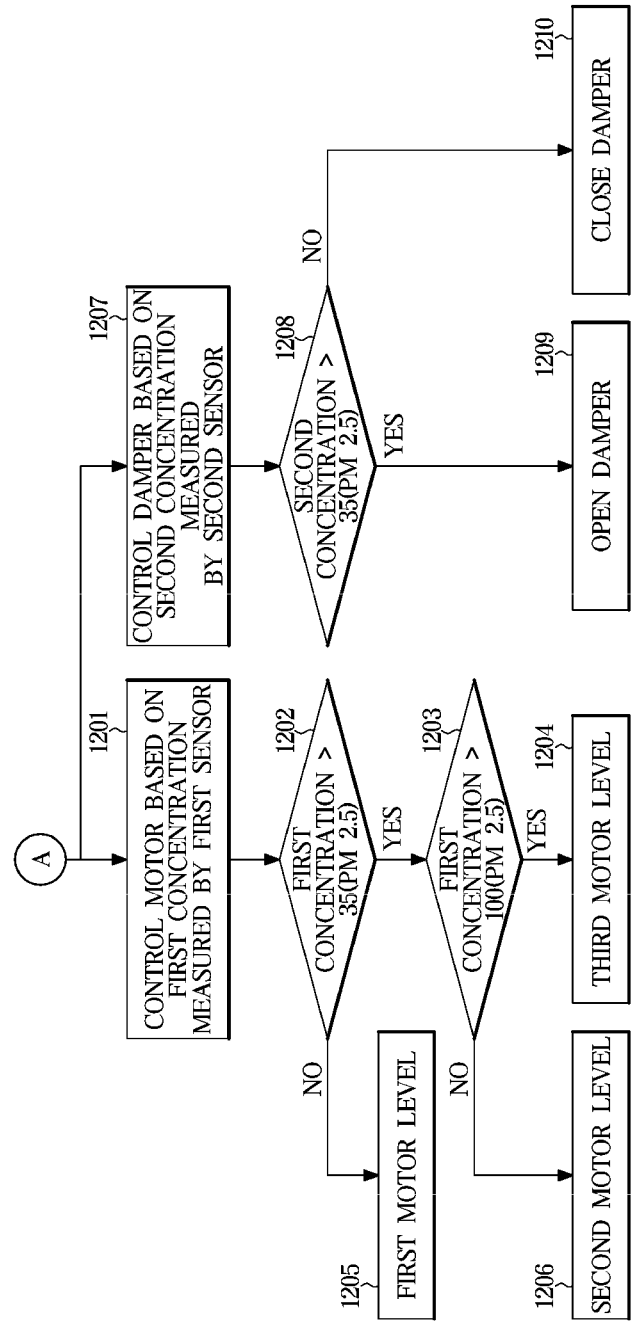
FIG. 12 is a flowchart of a method of controlling a range hood when a concentration of a contaminant measured by a first sensor is higher than a concentration of a contaminant measured by a second sensor.
Figure 13:
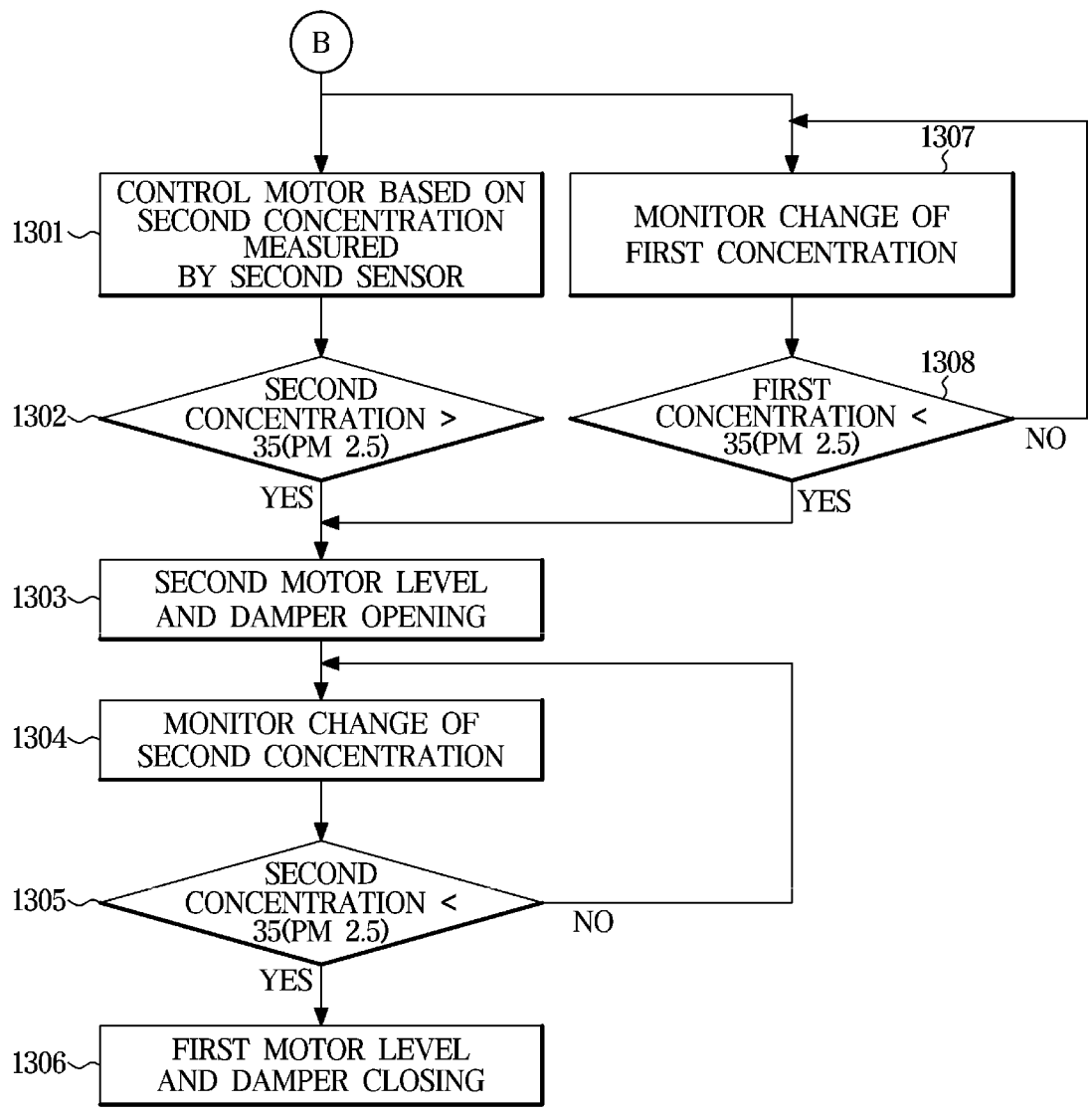
FIG. 13 is a flowchart of a method of controlling a range hood when a concentration of a contaminant measured by a second sensor is higher than a concentration of a contaminant measured by a second sensor.

FIG. 11 is a flowchart of a method of controlling a range hood according to an embodiment of the disclosure, FIG. 12 is a flowchart of a method of controlling a range hood when concentration of a contaminant measured by a first sensor is higher than concentration of a contaminant measured by a second sensor, and FIG. 13 is a flowchart of a method of controlling a range hood when concentration of a contaminant measured by a second sensor is higher than concentration of a contaminant measured by a second sensor.

The controller 200 receives concentrations of contaminants from the first sensor 310 and the second sensor 320 in 1101. The contaminant may refer to fine dust, ultrafine dust, exhaust fumes, smoke, etc., produced from the heating device 10, and when the first sensor 310 and the second sensor 320 are PM sensors, the controller 200 may obtain a concentration of fine dust ($\mu g/m^3$) as the concentration of the contaminant. The controller 200 may obtain an amount of fine dust produced from the heating device based on the concentration of the contaminant of the first sensor 310 and obtain an amount of fine dust around the ceiling surface based on the concentration of the contaminant of the second sensor 320, thereby determining where there are more contaminants.

The controller 200 may compare a first concentration obtained from the first sensor 310 with a second concentration obtained from the second sensor 320 in 1102, and may control the range hood 20 in a process according to FIG. 12 when the first concentration is higher (A) and control the range hood 20 in a process of FIG. 13 when the second concentration is higher (B).

In an embodiment of the disclosure, the controller 200 controls at least one of the fan module 100 or the damper 140 based on results of the comparing between the concentrations of the contaminants obtained from the first sensor 310 and the second sensor 320.

Although the first sensor 310 and the second sensor 320 are shown in FIGS. 12 and 13 as measuring the concentration of fine dust of PM 2.5, the disclosure is not limited thereto and is based on the concentration of various contaminants.

Referring to FIG. 12, an embodiment of the disclosure in which the first concentration obtained from the first sensor 310 is high will be described first.

Referring to FIG. 12, the controller 200 controls the motor 120 of the fan module 100 based on the first concentration measured by the first sensor 310 in 1201 and controls the damper 140 based on the second concentration measured by the second sensor 320 in 1207.

That the first concentration measured by the first sensor 310 is high means that the concentration of the contaminant produced from the heating device 10 is higher than the concentration of the contaminant stagnant around the ceiling. Accordingly, an output level of the fan module 100 is determined based on a lower side where the contamination level is relatively high. Even in this case, however, the damper 140 is controlled based on the concentration of the contaminant measured by the second sensor 320 to get rid of the contaminant around the ceiling.

In an embodiment of the disclosure, the controller 200 controls the output level of the fan module 100 based on the first concentration obtained from the first sensor 310 when the first concentration is higher than the second concentration obtained from the second sensor 320, and controls the damper 140 to be opened when the second concentration obtained from the second sensor 320 is higher than a preset concentration.

In this embodiment of the disclosure, the controller 200 controls the output level of the fan module 100 depending on the first concentration.

When the first concentration is not higher than 35 in 1202, the controller 200 controls the motor 120 to a first level in 1205; when the first concentration ranges between 35 to 100 in 1202, the controller controls the motor 120 to a second level in 1206; when the first concentration is higher than 100 in 1203, the controller 200 controls the motor 120 to third level in 1204. In other words, the controller 200 controls the range hood 20 to suck or draw in the contaminant produced from the heating device through the first inlet 31 by controlling the level of the motor 120 of the fan module 100 based on the first concentration.

The controller 200 controls the output level of the fan module 100 and simultaneously, controls the damper 140 based on the second concentration in 1207. Accordingly, both the contaminant produced from the heating device 10 and the contaminant that stays around the ceiling may be removed simultaneously.

When the second concentration is higher than 35 in 1208, the controller 200 opens the damper 140 in 1209 so that the contaminant stagnant around the ceiling is sucked or drawn in through the second inlet 35. When the second concentration is not higher than 35 in 1208, the controller 200 closes the damper 140 in 1210 to concentrate the suction power on the first inlet 31.

Next, referring to FIG. 13, an embodiment of the disclosure in which the second concentration obtained from the second sensor 320 is high will be described.

Referring to FIG. 13, the controller 200 controls the motor 120 of the fan module 100 based on the second concentration measured by the second sensor 320 in 1301 and monitors a change of the first concentration in 1307.

Basically, the range hood 20 according to the disclosure is to suck or draw in the contaminant produced from the heating device 10, and determines suction power of the fan module 100 based on the concentration of the contaminant on the heating device side.

In the embodiment of the disclosure, however, when the second concentration is higher than the first concentration, it is interpreted that the contamination level on the ceiling side is high, and controlling the fan module 100 based on the second sensor 320 rather than the first sensor 310 may improve air quality in the kitchen space.

For example, according to the embodiment in connection with FIG. 12 or a general embodiment of the disclosure, the controller 200 may control the motor 120 to the first level according to the first concentration when the second concentration is higher than 35 and the first concentration is lower than 35.

In this embodiment of the disclosure, however, controlling the fan module 100 is dependent on the measurement of the second sensor 320. Hence, the controller 200 controls the motor 120 to the second level in 1303 when the second concentration is higher than 35 in 1302 and the first concentration is lower than 35 in 1308. The controller 200 also controls the damper 140 to be opened to suck or draw in contaminant on the ceiling side. The range hood 20 may mitigate dispersion of the suction power due to the opening of the damper 140 by changing control criteria. In other words, even when the first concentration is measured to be very low, the lowest output level of the fan module is ensured.

The controller 200 monitors a change of the second concentration in 1304, and controls the fan module 100 and/or the damper 140 based on the second concentration.

When the second concentration is lower than 35 in 1305 as the fan module 100 continues to operate, the controller 200 controls the motor 120 to the first level and closes the damper 140.

In an embodiment of the disclosure, the controller 200 controls the output level of the fan module 100 based on the first concentration obtained from the first sensor 310 when the cooking apparatus is operated. The output level of the fan module 100 may be determined by controlling the level of the motor 120. In the beginning of the operation of the cooking apparatus, the contaminant is concentrated on the side of the heating device 10, so the level of the motor 120 is controlled based on the first concentration. After this, when the second concentration obtained from the second sensor 320 is higher than the first concentration obtained from the first sensor 310 during the operation of the cooking apparatus, the controller 200 opens the damper 140, and controls the output level of the fan module 100 based on the magnitude of the second concentration.

In the meantime, the concentration of the contaminant may be classified into a first range, a second range, and a third range depending on the magnitude. For example, based on a standard ultrafine dust level required by the ministry of environment, the first range may correspond to 15 to 35 $\mu g/m^3$, the second range may correspond to 36 to 75 $\mu g/m^3$ and the third range may correspond to 76 or more $\mu g/m^3$. In this case, the memory 220 may store settings by which the output level of the fan module 100 is the first level (first motor level) for the first range, the second level (second motor level) for the second range and the third level (third motor level) for the third range, and the controller 200 controls the fan module 100 according to the settings. Relations between the classified ranges and the output levels are an example, but output levels may be set for various ranges in an initial manufacturing stage and depending on the size of a particle detected by the sensor.

According to the aforementioned example, the controller 200 controls the output of the fan module 100 to the first level when the first concentration belongs to the first range, the second level when the first concentration belongs to the second range, and the third level when the first concentration belongs to the third range. However, when the first concentration belongs to the first range and the second concentration obtained from the second sensor 320 is higher than the first concentration obtained from the first sensor 310, the controller 200 may control the output of the fan module 100 to the second level or higher.

In an embodiment of the disclosure, the controller 200 may monitor a change of the second concentration, and when the second concentration belongs to the first range, control the output of the fan module 100 to the first level and close the damper. Furthermore, in an embodiment of the disclosure, when the second concentration obtained from the second sensor 320 is higher than a preset concentration, the controller 200 may open the damper 140 for the contaminant to be sucked or drawn in through the first inlet 31 and the second inlet 35. In this embodiment of the disclosure, air quality enhancement in the kitchen space is prioritized by opening the damper 140 based on an absolute value of the second concentration instead of relative comparison between the first concentration and the second concentration.

Furthermore, in an embodiment of the disclosure, when the operation of the cooking apparatus is stopped, the controller 200 may control the output level of the fan module 100 based on the magnitude of the second concentration while the damper 140 is opened. This is because removal of the contaminant on the ceiling side is prioritized because no contaminant is produced on the side of the heating device 10 after cooking is terminated.

Figure 14:
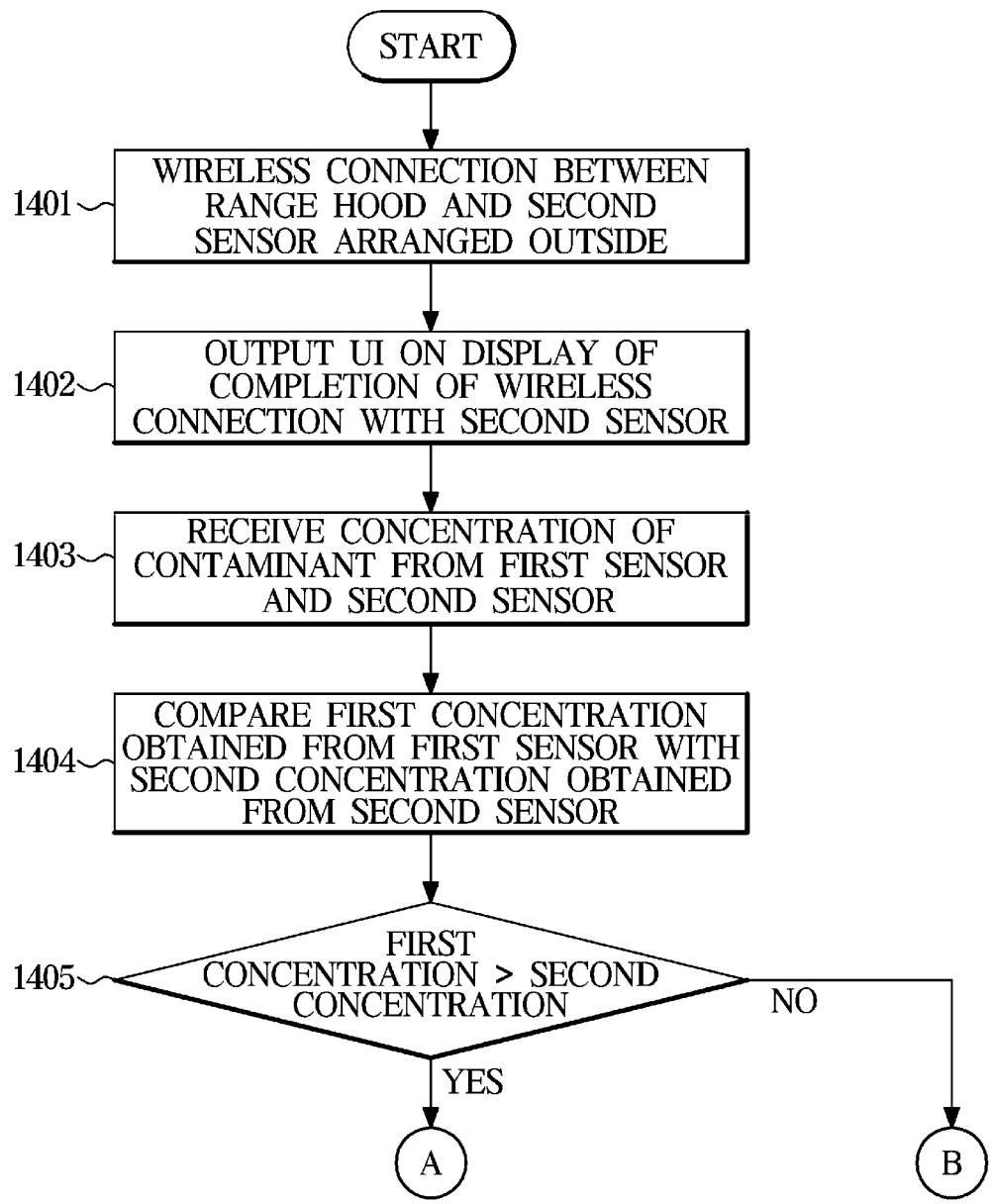
FIG. 14 is a flowchart of a method of controlling a range hood according to another embodiment of the disclosure.
Figure 15:
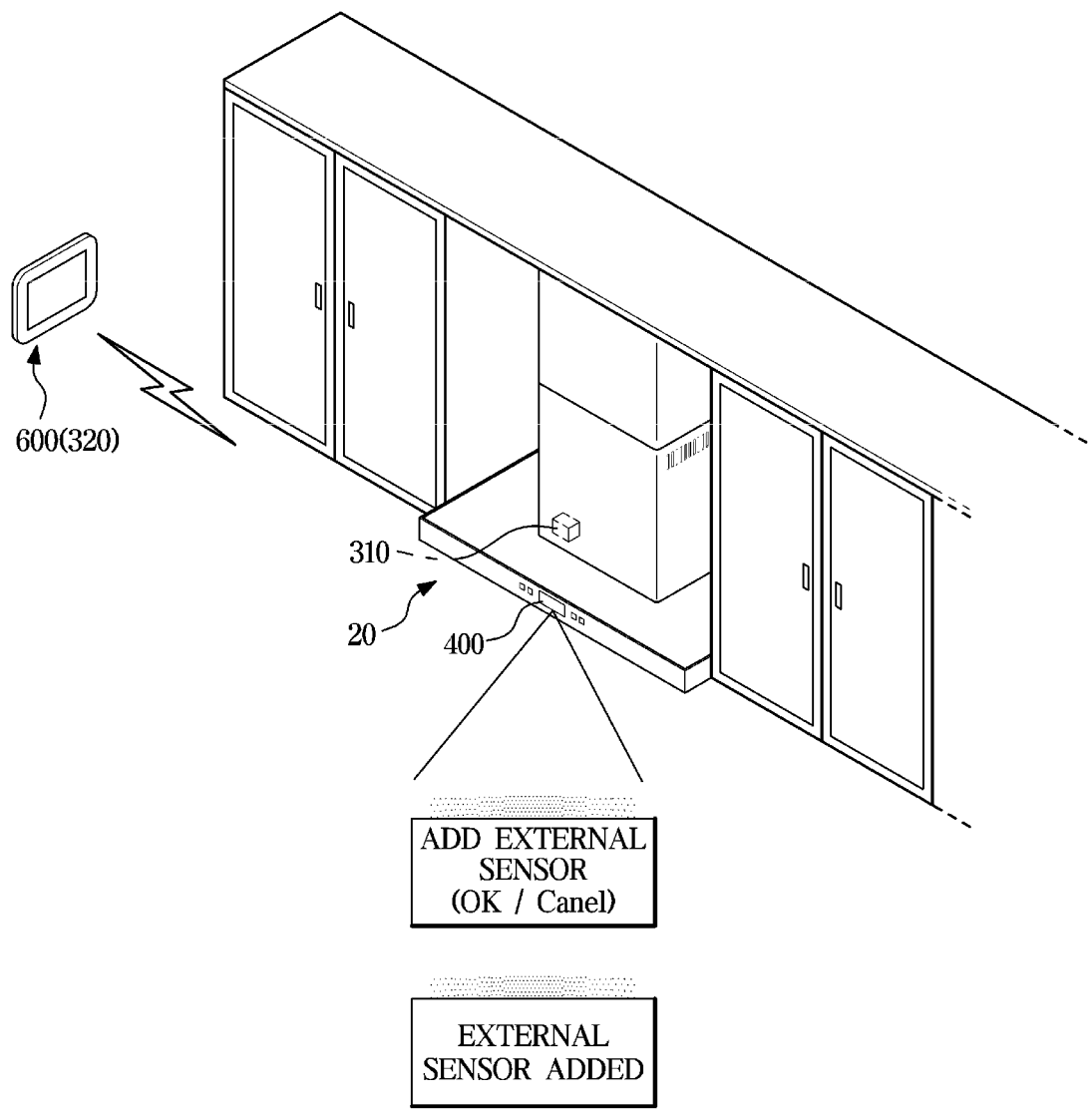
FIG. 15 illustrates interworking associated with a second sensor arranged outside and a range hood.

Although the second sensor 320 for measuring the concentration of the contaminant on the ceiling side is embedded in the range hood 20, the second sensor 320 may be provided in the external device 600 that works with the range hood 20 as shown in FIG. 15. In this regard, the range hood 20 may transmit or receive data with the external device 600 through Bluetooth communication or transmit or receive data with the external device 600 connected to a network through Wi-Fi. This will be described in connection with FIGS. 14 and 15.

FIG. 14 is a flowchart of a method of controlling a range hood according to another embodiment of the disclosure, and FIG. 15 illustrates interworking between a second sensor arranged outside and a range hood.

In an embodiment of the disclosure, the range hood 20 may include the communication module 500 for performing wireless communication with the external device 600 to obtain data obtained by the second sensor 320 arranged in the external device 600. The external device 600 may be one of an air conditioner, an air purifier or an air monitor, and may correspond to various home appliance devices equipped with a sensor for detecting or measuring contaminants in the indoor space.

The second sensor 320 is to detect a contaminant on the ceiling side, and a relative position of the second sensor 320 in the external device 600 from the range hood 20 is important.

The contaminant produced from the heating device 10 rises to the ceiling by buoyancy, stays on the ceiling side for a certain time, and falls.

In consideration of the movement tendency of the contaminant, when the external device 600 is within a certain distance from the range hood 20, it is desirable that the second sensor 320 in the external device 600 is positioned higher than the first sensor 310 in the range hood 20.

In an embodiment of the disclosure, the range hood 20 may further include a display for indicating an operating status of the range hood 20 and for receiving a user input. In this case, when detecting the external device 600 through the communication module 500, the range hood 20 may display the operating status to connect the range hood 20 to the external device 600 and to receive a user input corresponding to the operating status. For example, whether to employ the second sensor 320 may be left to the user's choice.

The range hood 20 may perform wireless communication with a user terminal (not shown), and the user terminal may have an application installed to control the range hood 20 and various external devices 600. In an embodiment of the disclosure, the communication module 500 may perform wireless communication with the user terminal that controls the range hood 20 and the external device 600, and the controller 200 may control the communication module 500 to obtain the second concentration from the external device 600 selected through the user terminal. For example, the user who knows the position of the second sensor 320 may determine interworking between the second sensor 320 and the range hood 20 through an application installed in the user terminal.

The controller 200 attempts wireless connection between the range hood 20 and the second sensor 320 arranged outside, in 1401. For example, the controller 200 may control the communication module 500 to interwork with the external device 600.

When the wireless connection between the external device 600 and the range hood 20 is completed, the controller 200 outputs a UI for indicating completion of the wireless connection with the second sensor 320 on the display 400, in 1402.

When the wireless connection between the range hood 20 and the second sensor 320 is completed, the controller 200 receives concentrations of contaminants from the first sensor 310 and the second sensor 320 in 1403. The controller 200 controls the communication module 500 to obtain the first concentration from the first sensor 310 and obtain the second concentration from the external device 600.

The contaminant may refer to fine dust, ultrafine dust, exhaust fumes, smoke, etc., produced from the heating device 10, and when the first sensor 310 and the second sensor 320 are PM sensors, the controller 200 may obtain a concentration of fine dust ($\mu g/m^3$) as the concentration of the contaminant. The controller 200 may obtain an amount of fine dust produced from the heating device 10 based on the concentration of the contaminant of the first sensor 310 and obtain an amount of fine dust around the ceiling surface based on the concentration of the contaminant of the second sensor 320, thereby determining where there are more contaminants.

The controller 200 may compare the first concentration obtained from the first sensor 310 with the second concentration obtained from the second sensor 320 in 1102, control the range hood 20 in a process according to FIG. 12 when the first concentration is higher (A) and control the range hood 20 in a process of FIG. 13 when the second concentration is higher (B).

In an embodiment of the disclosure, the controller 200 controls at least one of the fan module 100 or the damper 140 based on results of the comparing between the concentrations of the contaminants obtained from the first sensor 310 and the second sensor 320.

For example, the controller 200 may use the second sensor 320 arranged outside to estimate the concentration of the contaminant on the ceiling side, and use interworking with the external device 600 to improve air quality in the kitchen space.

Figure 16:
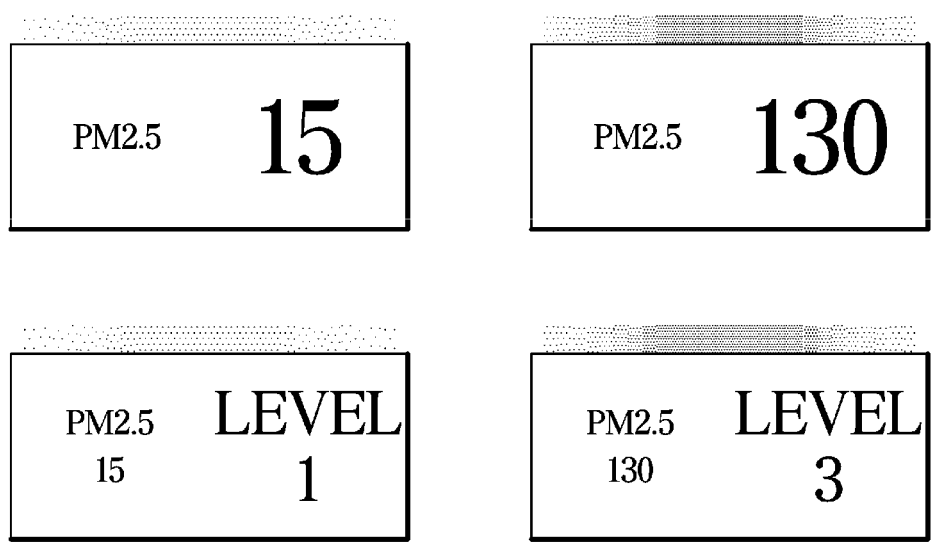
FIG. 16 illustrates outputs of user interfaces (UIs) on a display of a range hood according to an embodiment of the disclosure.
Figure 17:
FIG. 17 illustrates UIs output on a display of a range hood according to another embodiment of the disclosure.
Figure 17:
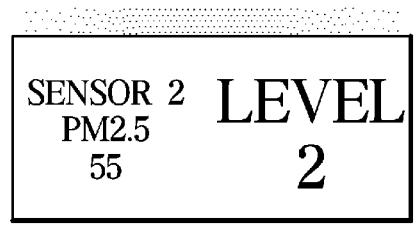

FIG. 16 illustrates UIs output on a display of a range hood according to an embodiment of the disclosure, and FIG. 17 illustrates UIs output on a display of a range hood according to another embodiment of the disclosure.

Referring to FIG. 16, in an embodiment of the disclosure, the display 400 may display the concentration of the contaminant measured by the first sensor 310 and a level of the motor corresponding to the concentration of the contaminant. For example, on the display 400 shown on the left side, concentration 15 measured about ultrafine dust PM2.5 and a corresponding output level of the fan module 100, motor level 1, are output. On the display 400 shown on the right side, concentration 130 measured about ultrafine dust PM2.5 and a corresponding output level of the fan module 100, motor level 3, are output. In this case, for each concentration of the contaminant and each output level, a different color may be output on the display 400 to emphasize visual effects.

In an embodiment of the disclosure, the range hood 20 may further include the display 400 for displaying the concentration of the contaminant and the output level of the fan module 100.

Furthermore, in an embodiment of the disclosure, the range hood 20 may display one of the first sensor 310 or the second sensor 320 based on comparing between the first concentration and the second concentration. Specifically, a sensor that measures a relatively high concentration of the contaminant may be displayed on the display 400 so that the user is able to know where there is much contaminant at second hand. The controller 200 may control the fan module 100 and the damper 140 based on the concentration measured by the sensor displayed, and control the display 400 to display the output level of the fan module 100 and the opening status of the damper 140.

For example, referring to FIG. 17, when concentration of the contaminant is high on the ceiling side, a message indicating this may be output on the display 400 and that the fan module 100 is controlled based on the second sensor 320 may be notified through the display 400.

Figure 18:
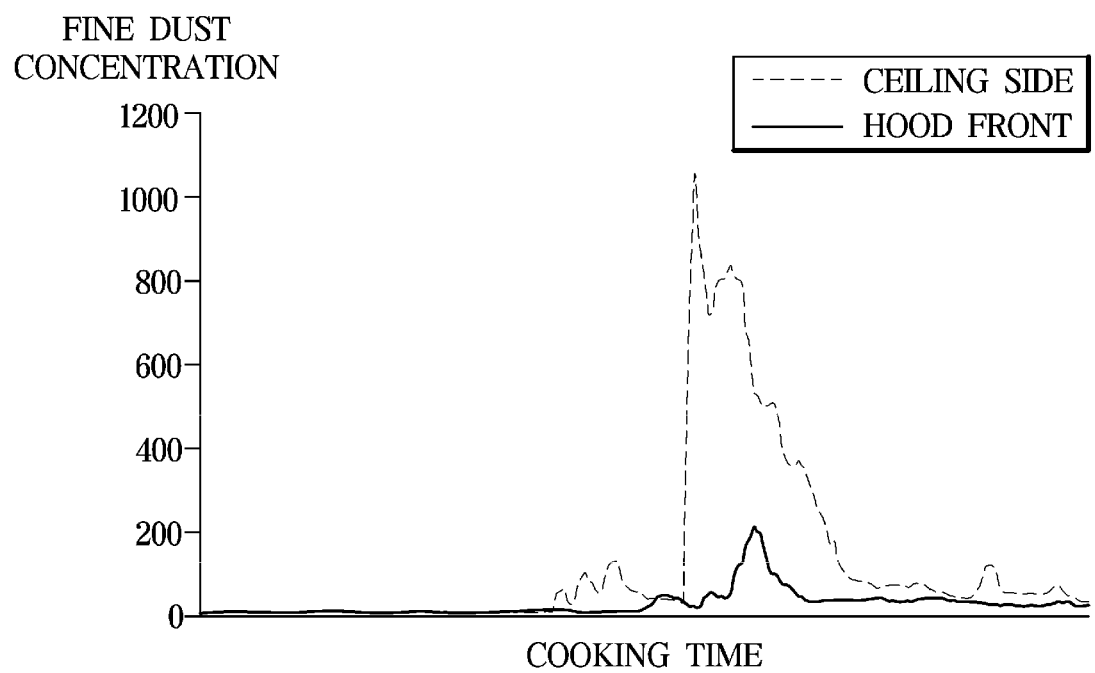
FIG. 18 illustrates changes in concentration of contaminants at a height of a hood front and a height of the ceiling surface after cooking is performed.

FIG. 18 illustrates changes in concentration of contaminants at a height of a hood front and a height of the ceiling surface after cooking is performed.

In FIG. 18, values measured about the concentration of fine dust produced when a mackerel is actually cooked and measured at a height of the user's nose and a ceiling surface are represented depending on the cooking time. Positions having peak values on two plots correspond to an occasion when the user turns over the object to be cooked or an occasion when oil spatters in a moment or there is non-uniform fluidity. As shown in FIG. 18, the concentration of fine dust produced during the cooking reveals a tendency that the fine dust is not sucked into the hood but accumulates around the surface of the ceiling rather than being dispersed through the food front. In the disclosure, the second inlet 35 and the damper 140 are additionally provided in the structure and the control of the fan module 100 may depend on the second sensor 320, thereby effectively getting rid of the fine dust gathered around the ceiling surface.

According to the disclosure, diffusion of contaminants produced in the kitchen may be prevented, and operation time of a range hood after completion of cooking may be saved by efficiently sucking in the contaminants.

According to the disclosure, an external sensor may be used to improve quality of indoor air through the range hood.

The embodiments of the disclosure have thus far been described with reference to accompanying drawings. It will be obvious to those of ordinary skill in the art that the disclosure may be practiced in other forms than the embodiments as described above without changing the technical idea or essential features of the disclosure. The above embodiments of the disclosure are only by way of example, and should not be construed in a limited sense.

What is claimed is:

1. A range hood comprising:
    a first case including a first inlet formed on a lower surface and a damper formed on an upper surface;
    a second case arranged over the first case to form a space in which a fan module is arranged and including a second inlet formed on a side surface;
    a first sensor arranged in the second case and configured to detect a contaminant;
    a second sensor arranged above the first sensor and configured to detect the contaminant; and
    a controller configured to control an output level of the fan module and to open or close the damper based on concentration data of the contaminants obtained from the first sensor and the second sensor.

2. The range hood of claim 1, wherein the controller is configured to:
control the output level of the fan module based on a first concentration of the contaminant obtained from the first sensor in response to the first concentration being higher than a second concentration of the contaminant obtained from the second sensor, and
open the damper in response to the second concentration being higher than a preset concentration.

3. The range hood of claim 1, wherein the controller is configured to:
control the output level of the fan module based on a first concentration of the contaminant obtained from the first sensor in response to operation of a cooking apparatus,
open the damper in response to a second concentration of the contaminant obtained from the second sensor being higher than the first concentration during the operation of the cooking apparatus, and
control the output level of the fan module based on a magnitude of the second concentration.

4. The range hood of claim 3, wherein the concentration of the contaminant is classified into a first range, a second range, and a third range depending on the magnitude, and
wherein the controller is configured to control the output level of the fan module to a first level in response to the first concentration belonging to the first range, a second level in response to the first concentration belonging to the second range, and a third level in response to the first concentration belonging to the third range.

5. The range hood of claim 4, wherein the controller is configured to control the output level of the fan module to the second level or higher in response to the first concentration belonging to the first range and the second concentration being higher than the first concentration.

6. The range hood of claim 4, wherein the controller is configured to:
monitor a change of the second concentration, and
in response to the second concentration belonging to the first range, control the output level of the fan module to the first level and close the damper.

7. The range hood of claim 1, further comprising: a display configured to display the concentration of the contaminant and the output level of the fan module.

8. The range hood of claim 7, wherein the controller is configured to: control the display to display one of the first sensor or the second sensor based on comparing between the first concentration and the second concentration, control the fan module and the damper based on a concentration measured by the sensor displayed, and control the display to display the output level of the fan module and an opening state of the damper.

9. The range hood of claim 1, wherein the controller is configured to open the damper for the contaminant to be sucked in through the first inlet and the second inlet in response to a second concentration obtained from the second sensor higher than a preset concentration.

10. The range hood of claim 9, wherein the controller is configured to control the output level of the fan module based on a magnitude of the second concentration while the damper is opened in response to termination of operation of a cooking apparatus.

11. A range hood comprising:
a first case including a first inlet formed on a lower surface and a damper formed in an upper surface;
a second case arranged over the first case to form a space in which a fan module is arranged and including a second inlet formed on a side surface;
a first sensor arranged in the second case and configured to detect a contaminant;
a communication module configured to perform wireless communication with an external device equipped with a second sensor for detecting a contaminant; and
a controller configured to control an output level of the fan module and an opening or closing of the damper based on concentration data of the contaminants obtained from the first sensor and the second sensor.

12. The range hood of claim 11, wherein the controller is configured to control the communication module to obtain a first concentration from the first sensor and obtain a second concentration from the external device.

13. The range hood of claim 11, further comprising: a display configured to display operation status of the range hood and to receive a user input,
wherein the controller is configured to indicate the operation status for connection between the range hood and the external device in response to detection of the external device and to receive the user input.

14. The range hood of claim 13, wherein the communication module is configured to perform wireless communication with a user terminal for controlling the range hood and the external device, and
wherein the controller is configured to control the communication module to obtain a second concentration from the external device selected through the user terminal.

15. The range hood of claim 14, wherein the external device comprises an air conditioner, an air purifier, or an air monitor.

16. A method of operating a range hood, comprising a first case including a first lower inlet and an upper damper, a second case arranged over the first case to form a space in which a fan module is arranged and including a second inlet formed on a side surface, and first and second sensors arranged in the second case and above the first sensor, respectively, and configured to detect contaminant, the method comprising:
receiving data of first and second concentrations of the contaminant from the first and second sensors;
determining magnitudes of the first and second concentrations and which of the first and second concentrations exceeds the other; and
controlling an output level of the fan module and an opening or closing of the damper based on determined magnitudes of the first and second concentrations and a determination of which of the first and second concentrations exceeds the other.

17. The method according to claim 16, wherein, in an event the first concentration exceeds the second concentration, the output level of the fan module is controlled based on the determined magnitude of the first concentration and the opening or closing is controlled based on the determined magnitude of the second concentration.

18. The method according to claim 17, wherein the output level of the fan module comprises first, second and third output levels that are engaged based on the determined magnitude of the first concentration.

19. The method according to claim 16, wherein, in an event the second concentration exceeds the first concentration, the output level of the fan module and the opening or closing of the damper is controlled based on the determined magnitude of the second concentration and a change in the first concentration.

20. The method according to claim 19, wherein the output level of the fan module comprises first and second output levels that are engaged based on the determined magnitude of the first concentration and the change in the first concentration.

* * * * *